US010091638B2

(12) United States Patent
Wang et al.

(10) Patent No.: US 10,091,638 B2
(45) Date of Patent: *Oct. 2, 2018

(54) SYSTEMS AND METHODS FOR REDUCING CONNECTION LATENCY

(71) Applicant: GOOGLE LLC, Mountain View, CA (US)

(72) Inventors: Liang-Yun Wang, Sunnyvale, CA (US); Martin Ünsal, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,097

(22) Filed: Nov. 8, 2017

(65) Prior Publication Data

US 2018/0070221 A1 Mar. 8, 2018

Related U.S. Application Data

(63) Continuation of application No. 14/978,077, filed on Dec. 22, 2015, now Pat. No. 9,820,135.

(60) Provisional application No. 62/095,628, filed on Dec. 22, 2014.

(51) Int. Cl.
| | |
|---|---|
| *H04B 7/00* | (2006.01) |
| *H04W 8/00* | (2009.01) |
| *H04W 4/00* | (2018.01) |
| *H04W 4/80* | (2018.01) |

(52) U.S. Cl.
CPC .......... *H04W 8/005* (2013.01); *H04W 4/008* (2013.01); *H04W 4/80* (2018.02)

(58) Field of Classification Search
CPC .............................. H04W 4/008; H04W 8/005
USPC ....................................... 455/41.2, 41.1, 41.3
See application file for complete search history.

(56) References Cited

U.S. PATENT DOCUMENTS

| | | | |
|---|---|---|---|
| 9,820,135 B2 * | 11/2017 | Wang | ..................... H04W 8/005 |
| 2010/0120362 A1 | 5/2010 | Walley et al. | |
| 2013/0040573 A1 | 2/2013 | Hillyard | |
| 2016/0037566 A1 | 2/2016 | Jakusovszky et al. | |

FOREIGN PATENT DOCUMENTS

| | | |
|---|---|---|
| WO | 2013/003753 | 1/2013 |
| WO | 2014/080252 A1 | 5/2014 |

* cited by examiner

*Primary Examiner* — Nay A Maung
*Assistant Examiner* — Angelica M Perez
(74) *Attorney, Agent, or Firm* — Van Court & Aldridge LLP

(57) ABSTRACT

Systems and methods for reducing connection latency are described herein. More particularly, this specification relates to shortening connection latency between devices operating according to a Bluetooth protocol. Connection latency can be reduced by using the receipt of a wireless packet as a trigger for selectively accelerating a transmission rate of advertising packets. By selectively accelerating the transmission rate advertising packets, a connection interval between two devices can be shortened.

17 Claims, 5 Drawing Sheets

SYSTEMS AND METHODS FOR REDUCING CONNECTION LATENCY

RELATED APPLICATION

This patent application is a continuation of U.S. patent application Ser. No. 14/978,077 filed Dec. 22, 2015 (now U.S. Pat. No. 9,820,135), which claims priority to U.S. Provisional Patent Application No. 62/095,628, filed Dec. 22, 2014. Each of the above-referenced patent applications is incorporated by reference in its entirety for all purposes.

TECHNICAL FIELD

This patent specification relates to systems and methods for reducing connection latency. More particularly, this specification relates to shortening connection latency between devices operating according to a Bluetooth protocol.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Bluetooth Low Energy (BLE) is a wireless radio technology, aimed at new, principally low-power and low-latency applications for wireless devices within a short range (up to about 160 feet). BLE networks are particularly well-suited for a wide range of applications and smaller form factor devices in the healthcare, fitness, security and home entertainment industries. As its name implies, BLE is intended for such energy-constrained applications as a sensor or a disposable device, particularly those that transmit relatively little data and do so infrequently. BLE was designed to enable wireless connectivity with small devices running for extended periods of time on, for example, a coin cell battery. While an objective of networks that utilize BLE technologies is robust and secure delivery of information, saving battery power is also a concern.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for reducing connection latency are described herein. More particularly, this specification relates to shortening connection latency between devices operating according to a Bluetooth protocol. Connection latency can be reduced by using the receipt of a wireless packet as a trigger for selectively accelerating a transmission rate of advertising packets. By selectively accelerating the transmission rate advertising packets, a connection interval between two devices can be shortened. For example, in one embodiment, a method is provided for operating a device according to a first advertising mode that transmits adverting packets according to a first frequency. The method further includes receiving a scan request packet in response to the transmission of one of the adverting packets, and operating the device according to a second advertising mode in response to the received scan request packet, wherein in the second advertising mode the adverting packets are transmitted according to a second frequency that is greater than the first frequency.

In another embodiment, an apparatus is provide the includes a wireless transceiver and control circuitry coupled to the wireless transceiver and operative to cause the wireless transceiver to send and receive wireless packets. The control circuitry can be operative to transmit advertising packets at an advertising frequency having a first period, monitor for receipt of a scan request packet within a listening window, determine if a scan request packet is monitored, adjust the advertising frequency to have a second period in response to a determination that a scan request packet is monitored, wherein the second period is less than the first period, and transmit at least one subsequent advertising packet at the advertising frequency having the second period.

In yet another embodiment, a method for establishing low latency connection between central and peripheral devices is provided. The method can be implemented by the peripheral device and can include wirelessly transmitting advertising packets to alert the presence of the peripheral device to the central device, and adjusting an advertising rate for transmitting the advertising packets based on whether a scan request packet is received in response to a transmitted advertisement package, wherein the advertising rate is temporarily accelerated in response to a received scan request packet to reduce latency in establishing a connection between the central and peripheral devices.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In some wireless networks, wireless devices set up connections with each other to facilitate data transfer. This disclosure focuses on BLE networks, but the scope of the disclosure and the claims applies to other network types as well. The problem with the connection setup process is that a BLE slave device spends a great deal of time in the connection setup phase. In general, a BLE device may operate in different modes depending on required functionality. The main modes of operation include the advertising mode, the scanning mode, central device mode, and peripheral device mode. In advertising mode, the BLE device periodically transmits advertising packets and may respond with more information upon request from other devices. In the scanning mode, a BLE device listens for and receives advertising packets transmitted by other devices and may request additional information from the originator of an advertising packet. A central device may passively scan or actively scan. A peripheral device can connect to a single central, but a central may connect to multiple peripheral devices simultaneously.

To establish a connection, a first BLE device transmits an advertising packet. A second BLE device responds to the advertising packet and may request additional information. If additional information is requested, the first device transmits the requested information. The connection can then be established with the first device being the peripheral device and the second device being the central device. In this disclosure, references to "peripheral device" refer to the BLE device that sends out the advertising packets, and the "central device" is the BLE device that receives and responds to the advertising packets.

Figure 1:
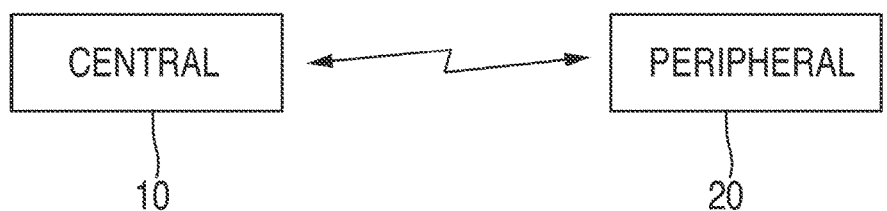
FIG. 1 shows two wireless devices, according to an embodiment.

FIG. 1 shows two wireless devices 100 and 200. Wireless device 100 is a central device and wireless device 200 is a peripheral device. As noted above, to establish a connection between the central device 100 and peripheral device 200, peripheral device 200 transmits an advertising packet which, if received by central 100, indicates the presence of peripheral device 200 to central device 100. Central device 100 may respond with a scan request (SCAN_REQ) packet. Peripheral device 200 responds to the SCAN_REQ with a scan response (SCAN_RSP) packet to provide additional data if necessary before establishing the connection. Central device 100 and peripheral device 200 thus engage in information exchange before establishing a connection. By way of example, central device 100 may be a line powered device or a device with substantial power reserves, and peripheral device 200 may be a battery powered device with limited power reserves. As a specific example, central device 100 may be a locking mechanism of a door that can control access to a home, and peripheral device 200 may be a portable fob that a user can use to gain access to the home via central device 100. That is, when a user is within close proximity of the home, peripheral device 200 may alert its presence to central device 100, which may attempt to connect to device 200. After a connection is made, the user may lock or unlock the door using the portable fob.

Figure 2:
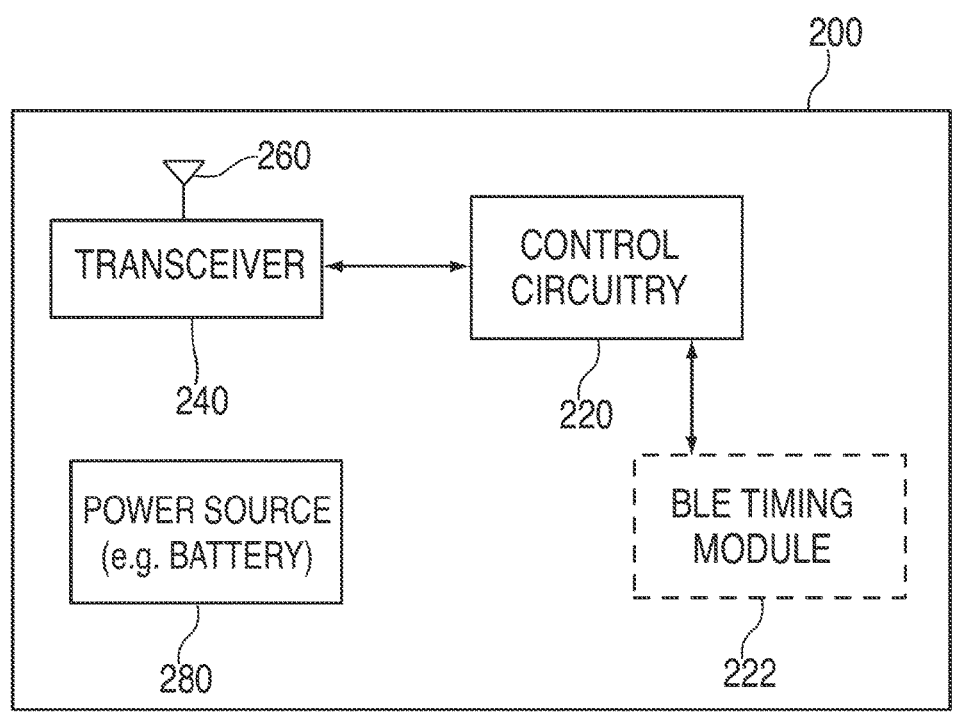
FIG. 2 illustrates a block diagram of a peripheral device, according to an embodiment.

FIG. 2 illustrates a block diagram of peripheral device 200. As shown, device 200 includes control circuitry 220, BLE timing module 222, transceiver 240, antenna 260, and power source 280. Power source 280 provides electrical power to circuitry 220, module 222, and transceiver 240. Transceiver 240 can accept signals from circuitry 220 to transmit wirelessly via antenna 260. Similarly, wireless signals received by antenna 260 are provided by transceiver 240 to controller 220 for processing. Transceiver 240 may be capable of bi-directional data communications with another wireless device such as central device 100. Control circuitry 220 may include a processor that executes software. Control circuitry 220 may access BLE timing module 222 to adjust an advertising frequency according to various embodiments. Control circuitry 220 can perform some or all of the functionality described herein as attributed to peripheral device 200. The architecture depicted in FIG. 2 may be used as well to implement central device 100.

In the BLE protocol, channels 37, 38, and 39 are dedicated for use in transmitting advertising packets and the associated responses. Central device 100 can listen on each advertising channel for an advertising packet being transmitted by peripheral device 200. Central device 100 can passively listen or actively listen for advertising packets. During passive listening, central device 100 may not transmit scan requests responsive to a received advertising packet. During active scanning, however, central device 100 may transmit scan requests responsive to a received advertising packet.

Peripheral device 200 may transmit advertising packets according to an advertising frequency. The advertising frequency can characterized as having an advertising period. Thus, device 200 can transmit an advertising packet at the end of each advertising period. Within each period, device 200 can listen for wireless packets during a listen window. The listen window may have a start point that coincides with the start of a period, and an end point that defines the end of the listen window. The listen window may be a fixed parameter set, for example, by a Bluetooth Low Energy (BLE) protocol. The listen window may define the only time during an advertising period during which device 200 can listen for wireless packets. For example, device 200 may listen for scan request packets or connection request packets being transmitted by central device 100 during the listen window.

Figure 3:
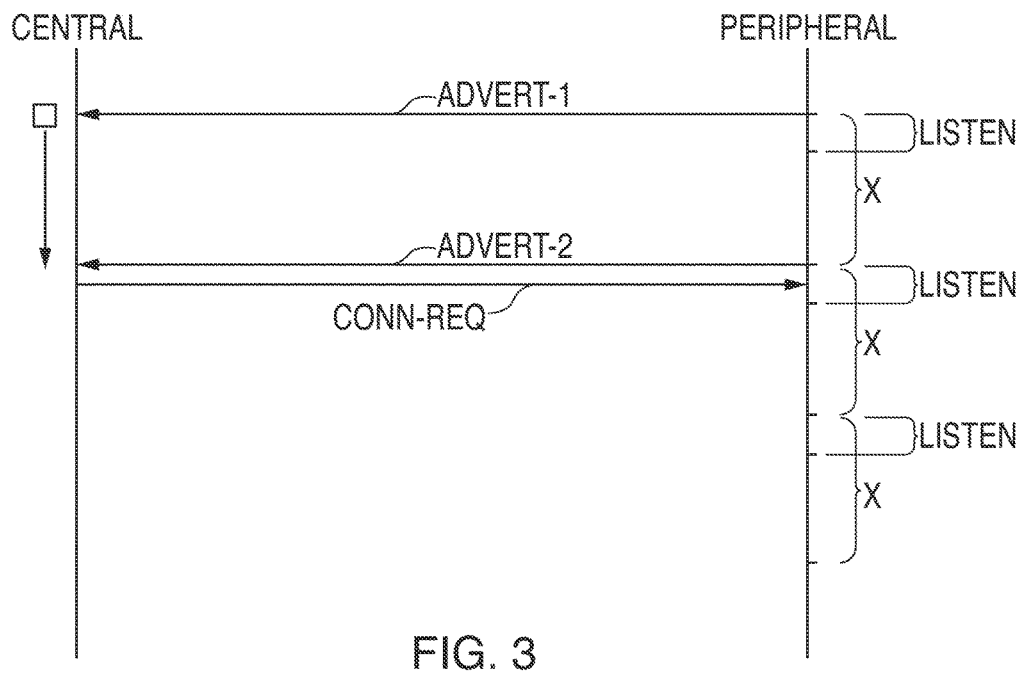
FIG. 3 shows an illustrative timing diagram of wireless communications between central and peripheral devices, where the central is passively listening.

FIG. 3 shows an illustrative timing diagram of wireless communications between central and peripheral devices, where the central is passively listening. An advertisement packet (shown as "advert_n") is transmitted at an advertising frequency having a period of X. The listen window is shown to exist within each period. In this timing diagram, the peripheral device transmits advert_1 to alert the presence of the peripheral to the central device. After the central receives advert_1, it must wait until it receives advert_2 before it attempts to send, for example, a connection request packet (shown as "Conn_Req") to the peripheral. The central may have to wait for a subsequent advertising packet to be received before attempting to send a packet because of the limited listen window of the peripheral. That is, the central may have to immediately transmit a packet after receiving an advertisement packet to ensure the peripheral receives it during its listen window. This packet exchange may occur more than once to ensure packets are adequately transmitted and received.

Figure 4:
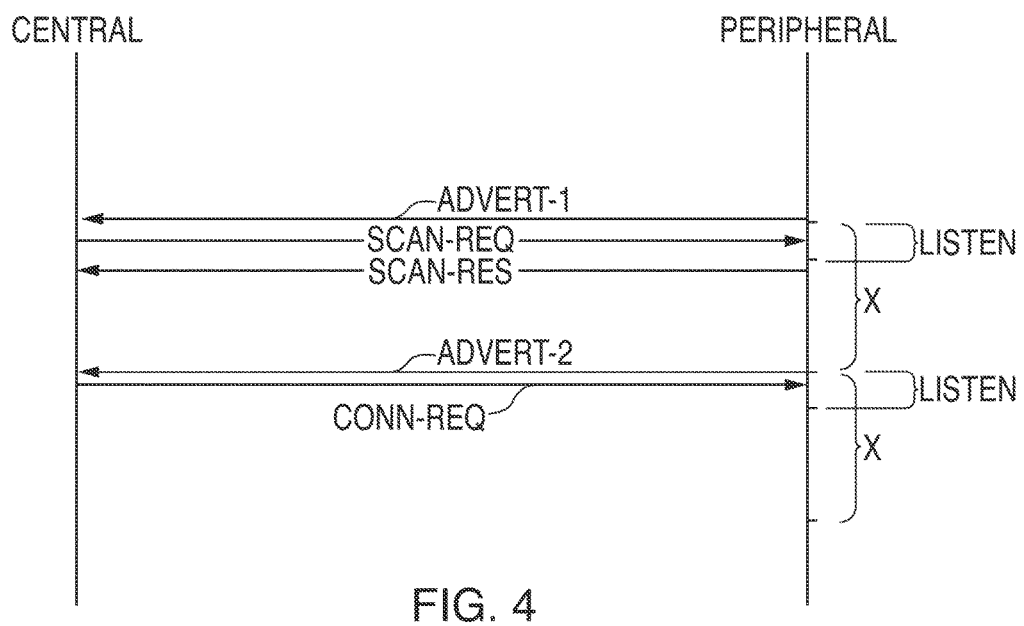
FIG. 4 shows an illustrative timing diagram of wireless communications between central and peripheral devices, where the central is actively listening.

FIG. 4 shows an illustrative timing diagram of wireless communications between central and peripheral devices, where the central is actively listening. As with the timing diagram of FIG. 3, the advertising packets are transmitted according to an advertising frequency having a period of X. In response to receiving advert_1, the central may immediately transmit a scan request packet (shown as "Scan_Reg") to the peripheral so that it is received during the listen window. The peripheral may respond to the scan request packet by transmitting a scan response packet (shown as "Scan_Res"). The scan request and scan response packets may be handled by a different level of the software stack for implementing BLE communications than the level that handles advertising packets. Thus, the scan response packets may not be constrained by the advertising frequency. The can request packet may be transmitted by the central to request additional information from the peripheral. The central may evaluate the scan response packet received in response to its scan request packet to determine whether it wishes to establish a connection with the peripheral. If the central decides to establish a connection, it will wait until it receives another advertisement packet from the peripheral and immediately transmit a connection request packet. This is illustrated in the timing diagram, where Conn_Req is transmitted in response to receiving Advert_2.

The timing diagrams of both FIGS. 3 and 4 both illustrate that a connection sequence requires a minimum of two advertising packets in order to establish a connection. Thus, the advertising frequency is shown to be a limiting factor establishing a connection. The advertising period is X, thus a connection interval can range from X to 2X. The X-2X interval may be perceived as too long a time to establish a connection. For example, users may become frustrated with the slow connection experience. Peripheral devices may operate at the advertising frequency having the X period to strike an appropriate balance between power consumption and connectively. Shorter X periods may provide a faster connection interval, but at the expense of increased power consumption. Since peripheral devices typically operate using a relatively limited power source, increasing power consumption is not a viable option.

Embodiments herein strive to decrease the connection interval with minimal increase in power consumption by leveraging the scan request packet to selectively adjust the advertising frequency to temporarily operate at a faster advertising frequency. Assuming that the advertising frequency normally operates with a first period, the peripheral device can change the advertising frequency to operate with a second period in response to a received scan request packet, where the second period is less than the first period, thereby resulting in a faster transmission of advertising packets. This enables the central device to establish a connection faster with the peripheral device. The scan request packet can be used as a trigger for selectively adjusting the advertising frequency. This additional use of the scan request packet does not conflict with the provisions of the BLE protocol, but advantageously is additionally purposed to enable the peripheral device to throttle its advertising rate.

Figure 5:
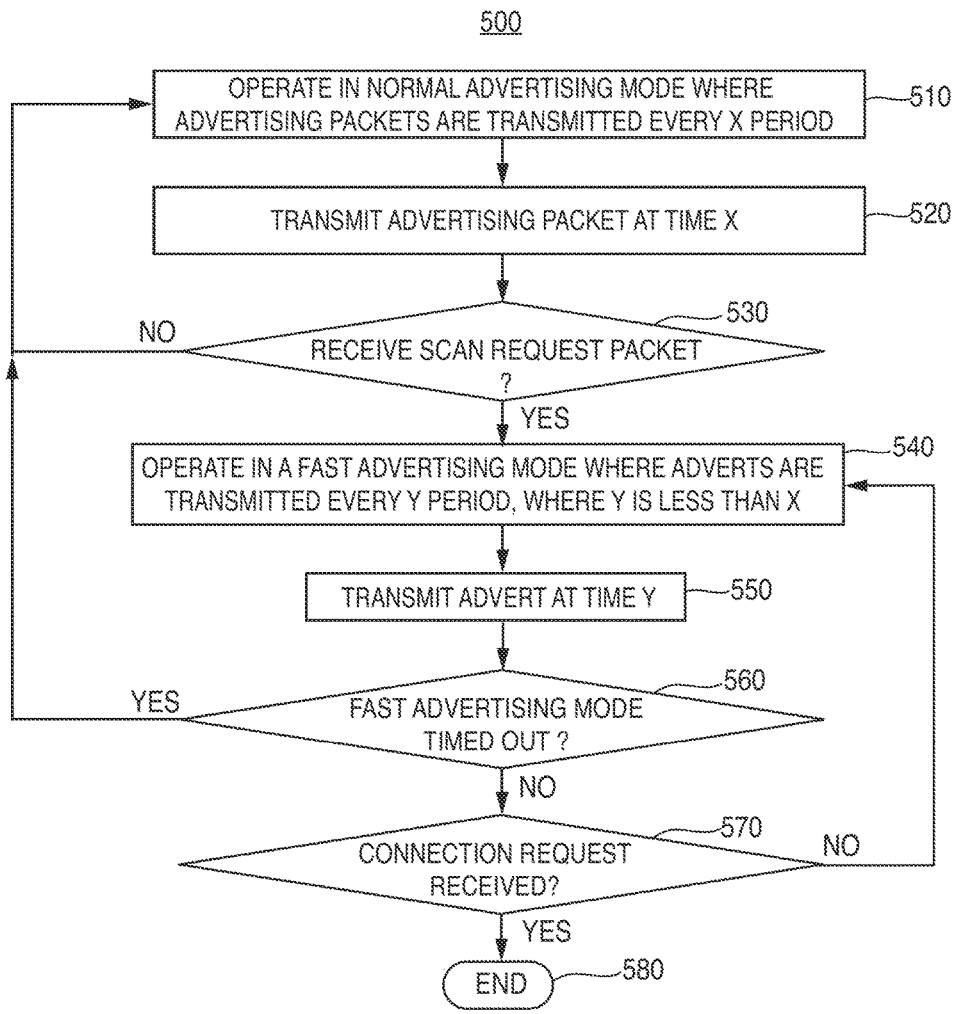
FIG. 5 shows an illustrative flowchart of a process that may be implemented by a peripheral device according to an embodiment.
Figure 6:
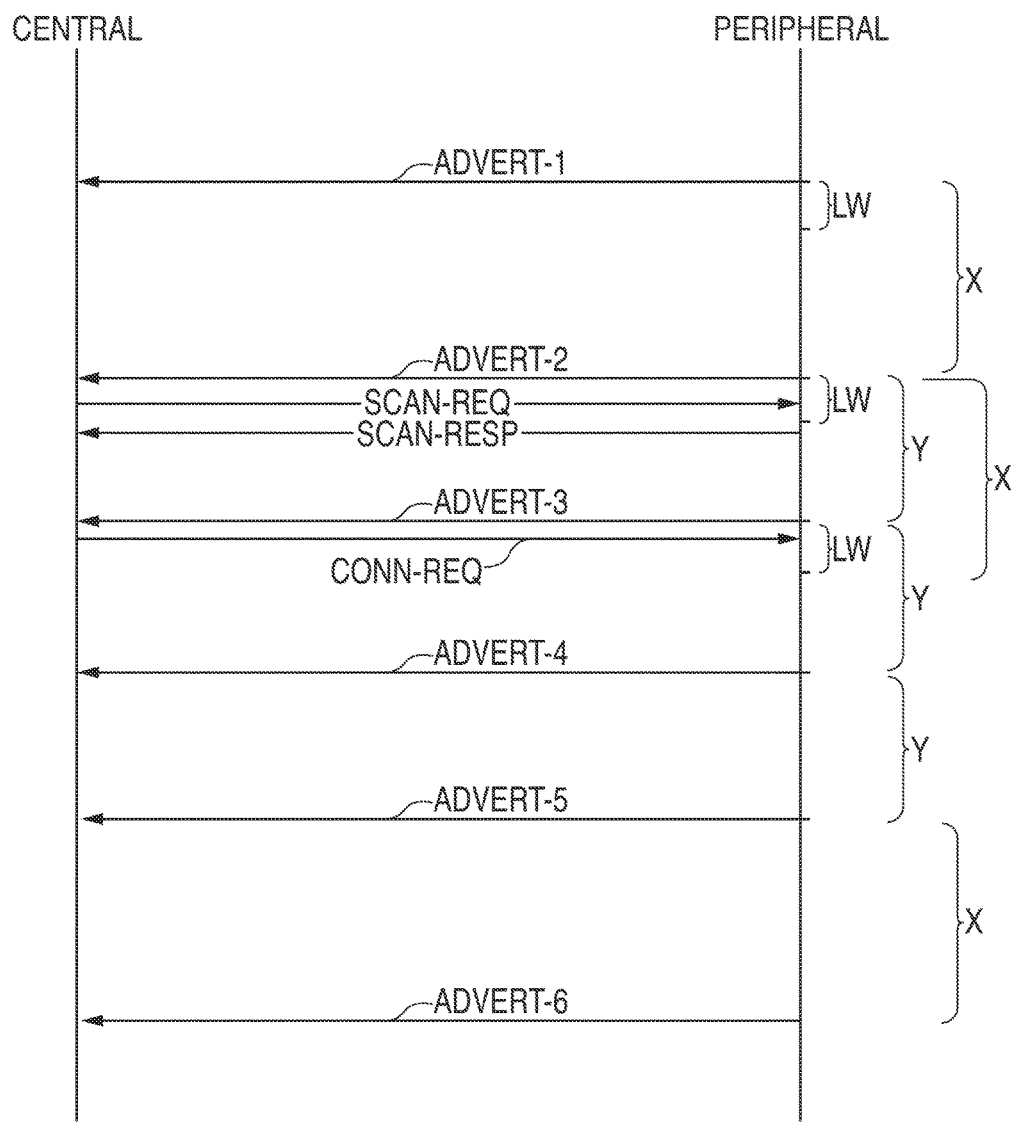
FIG. 6 shows an illustrative timing diagram of wireless communications between central and peripheral devices, performed according to the process of FIG. 5, according to an embodiment.

FIG. 5 shows an illustrative flowchart of process 500 that may be implemented by a peripheral device according to an embodiment. FIG. 6 shows an illustrative timing diagram of wireless communications between central and peripheral devices, performed according to process 500. FIGS. 5 and 6 will be collectively reference in the following discussion. Starting at step 510, the peripheral device may be operating in a normal (first) advertising mode, where adverting packets are transmitted every X period, as indicated by step 520. Advert_1 and Advert_2 are transmitted while the peripheral device is operating in the normal advertising mode. The normal advertising mode may represent the mode where the peripheral device spends the majority of its operational life. This is in contrast to a fast (second) advertising mode, discussed below, which is a temporary operational mode of the peripheral device.

At step 530, a determination is made as to whether a scan request packet is received. As discussed above, the peripheral may only be capable of receiving packets during its listen window, shown as LW in FIG. 6. If no scan request packet is received, process 500 may return to step 510. For example, because no scan request packet is received after advert_1 was transmitted at step 530, process 500 returns to step 510. If a scan request packet is received at step 530, process 500 may proceed to step 540. For example, a scan request packet is received after transmission of advert_2. The peripheral device may transmit a scan response packet in response (shown as "Scan_Resp").

At step 540, the peripheral device may operate in a fast advertising mode where advertising packets are transmitted every Y period, where Y is less than X. The timing diagram illustrates the change in the advertising period to period Y. In addition, the timing diagrams shows that Adverts_3-5 are transmitted when the peripheral device is operating in the fast advertising mode. At step 550, an advertising packet is transmitted at time Y. For example, Advert_3 is transmitted at time Y as opposed to time X.

At step 560, a determination is made whether the fast advertising mode has timed out. The fast advertising mode may time out after a fixed period of time or transmission of a fixed number of advertising packets. If the determination is YES, process 500 may proceed to step 510. If the determination is NO, process 500 may proceed to step 570, which determines whether a connection request is received. If the determination at step 570 is NO, process 500 may loop back to step 540, otherwise, if YES, process 500 may end at step 580.

Referring to FIG. 6, a connection request packet is transmitted after Advert_3 is transmitted. According to process 500, process 500 would end and the standard connection process may ensue. Assume, for example, that no connection request packet is transmitted. Based on process 500, process 500 may continue to transmit advertising packets at period Y until it time outs. After it times out, the peripheral may return to operating in the normal advertising mode, during which it transmits advertisements every X period.

It should be appreciated that the steps of FIG. 5 are merely illustrative and that additional steps may be added, steps may be omitted, or the steps may be re-ordered. For example, the peripheral device may perform additional steps upon receipt of a scan request packet. These additional steps are discussed in FIG. 7.

Figure 7:
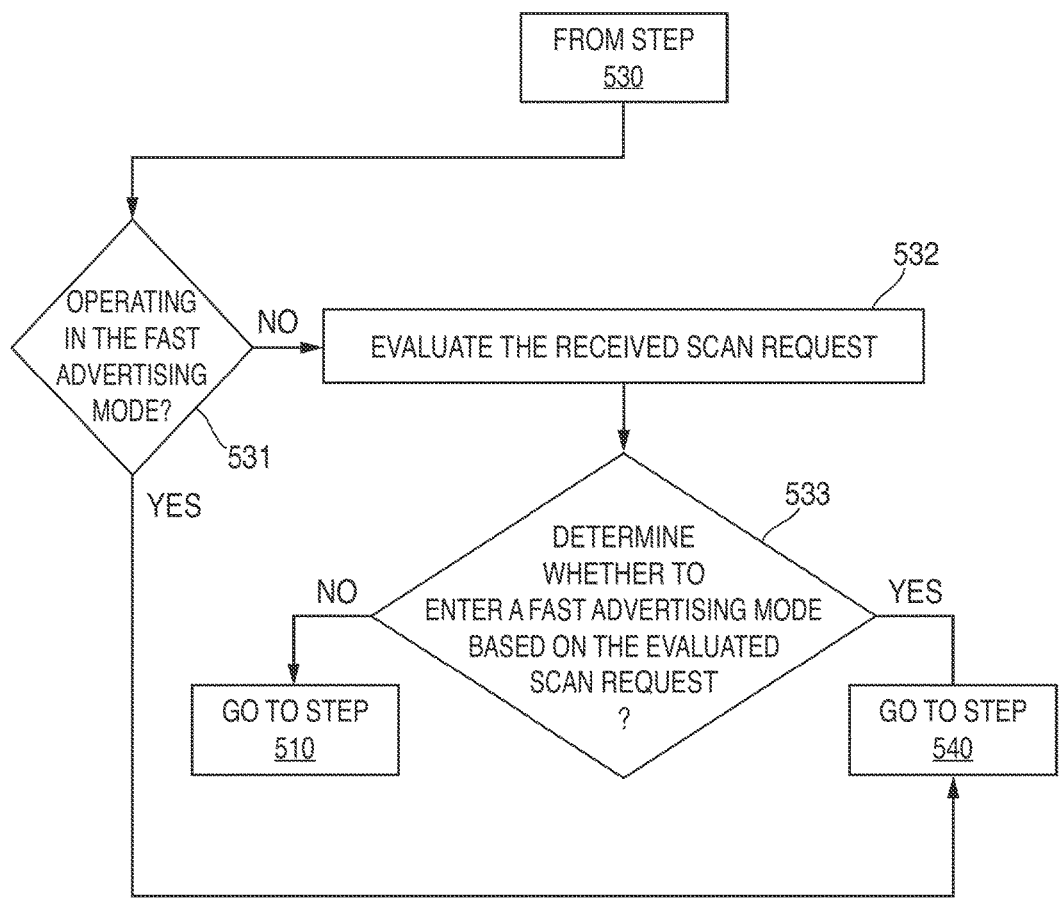
FIG. 7 shows illustrative additional steps may be performed by the process of FIG. 5, according to an embodiment.

FIG. 7 shows illustrative additional steps may be performed by process 500 in response to a determination that a scan request packet is received at step 530. At step 531, a determination is made whether the peripheral device is operating in the fast operating mode. If the determination at step 531 is YES, process 500 may proceed to step 540, where process 500 continues to operate in the fast operating mode. If the determination is NO, process 500 may proceed to step 532. At step 532, the peripheral device may evaluate the received scan packet to determine whether to enter into the fast advertising mode (step 533). The evaluation criteria can include, for example, verification of a source of the packet and verification of an intention of the source. For example, if the source does not have permission to communicate with the peripheral, then the peripheral may not enter into the fast advertising mode. If the determination at step 533 is NO, process 500 may return to step 510. If the determination is YES, process may proceed to step 540.

Any processes described with respect to FIGS. 1-7, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method, comprising:
   operating a device according to a first mode that transmits a first type of packet according to a first frequency, the first frequency comprising a first period characterized by a start time and a first end time;
   receiving a second type of packet in response to the transmission of one of the first type of packet; and
   temporarily operating the device according to a second mode in response to the received second type of packet, wherein in the second mode the first type of packet is transmitted according to a second frequency that is greater than the first frequency to reduce latency in establishing a connection between the device and another device that transmitted the second type of packet, the second frequency comprising a second period characterized by the same start time as the first period and a second end time, wherein the second end time is less than the first end time, wherein the first and second modes are different from each other and wherein the first and second types of packets are different from each other.

2. The method of claim 1, wherein the device is a peripheral device that wirelessly communicates according to a BlueTooth Low Energy (BLE) protocol.

3. The method of claim 1, further comprising:
   receiving a third type of packet in response to a first type of packet transmitted when the device is operating in the second mode, wherein the third type of packet is different from the first and second types of packets.

4. The method of claim 1, further comprising:
   determining whether the second mode has timed out; and
   in response a determination that the second mode has timed out,
      ceasing to operate the device in the second mode; and
      returning to operating the device in the first mode.

5. The method of claim 1, further comprising:
   evaluating the received second type of packet to determine whether the device is permitted to enter into the second mode.

6. An apparatus, comprising:
   a wireless transceiver, wherein the wireless transceiver is operative to receive a first type of packet; and
   control circuitry coupled to the wireless transceiver and operative to cause the wireless transceiver to send and receive wireless packets, the control circuitry operative to:
   transmit a second type of packet at a transmission frequency having a first period;
   receive a first type of packet within a listening window;
   evaluate the received first type of packet;
   determine whether the evaluated first type of packet meets predetermined criteria;
   adjust the transmission frequency to have a second period in response to a determination that the predetermined criteria are met, wherein the second period is less than the first period; and transmit at least one subsequent packet of the second type at the transmission frequency having the second period, wherein the first and second types of packets are different from each other.

7. The apparatus of claim 6, wherein the second period is selected based on a processing speed of a central system transmitting the first type of packet.

8. The apparatus of claim 6, wherein the control circuitry is operative to instruct the wireless transceiver to transmit a third type of packet in response to a determination that a first type of packet is monitored, wherein the third type of packet is different from the first and second types of packets.

9. The apparatus of claim 6, wherein the control circuitry is operative to instruct the wireless transceiver to transmit the second type of packet at the transmission frequency having the second period until a fast transmission mode times out.

10. The apparatus of claim 6, wherein the predetermined criteria comprises verification of a source, verification of an intention of the source, and whether the apparatus is already transmitting the first type of packet at the transmission frequency having the second period.

11. The apparatus of claim 6, wherein the control circuitry is operative to instruct the wireless transceiver to transmit the second type of packet at the transmission frequency having the second period until a fourth type of packet is received, wherein the fourth type of packet is different from the first and second types of packets.

12. The apparatus of claim 6, wherein the wireless transceiver is operative to receive a fourth type of packet in response to an first type of packet transmitted according the transmission frequency having the second period, wherein the fourth type of packet is different from the first and second types of packets.

13. The apparatus of claim 6, wherein the control circuitry implements a BlueTooth Low Energy (BLE) protocol.

14. A method for establishing low latency connection between central and peripheral devices, the method implemented by the peripheral device, comprising:
wirelessly transmitting a first type of packet to alert the presence of the peripheral device to the central device;
adjusting a transmission rate for transmitting the first type of packet based on whether a second type of packet is received in response to a transmitted first type of packet, wherein the transmission rate is temporarily accelerated in response to a received second type of packet to reduce latency in establishing a connection between the central and peripheral devices, wherein the first and second types of packets are different from each other;
prior to receiving the second type of packet, wirelessly transmitting the first type of packet according to a first transmission rate, the first transmission rate comprising a first period characterized by a start time and a first end time; and
after receiving the second type of packet, wirelessly transmitting the first type of packet according to a second transmission rate, the second transmission rate comprising a second period characterized by the same start time as the first period and a second end time, wherein the second end time is less than the first end time.

15. The method of claim 14, further comprising:
wirelessly transmitting the first type of packets at the accelerated transmission rate.

16. The method of claim 14, further comprising wirelessly transmitting an first type of packet substantially immediately after the second end time.

17. The method of claim 16, further comprising receiving a third type of packet in response to the first type of packet transmitted substantially immediately after the second end time, wherein the third type of packet is different from the first and second types of packets.

* * * * *